United States Patent
Tabuki

(10) Patent No.: US 12,189,483 B2
(45) Date of Patent: Jan. 7, 2025

(54) INFORMATION PROCESSING APPARATUS THAT PERFORMS PROGRAM RECOVERY USING LIMITED STORAGE SPACE, METHOD FOR CONTROLLING THE SAME AND STORAGE MEDIUM

(71) Applicant: CANON KABUSHIKI KAISHA, Tokyo (JP)

(72) Inventor: Masumi Tabuki, Oita (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 129 days.

(21) Appl. No.: 17/978,371

(22) Filed: Nov. 1, 2022

(65) Prior Publication Data
US 2023/0185669 A1 Jun. 15, 2023

(30) Foreign Application Priority Data
Dec. 15, 2021 (JP) ................. 2021-203607

(51) Int. Cl.
*G06F 11/14* (2006.01)
*G06F 8/65* (2018.01)
*G06F 8/654* (2018.01)

(52) U.S. Cl.
CPC .......... *G06F 11/1433* (2013.01); *G06F 8/654* (2018.02)

(58) Field of Classification Search
CPC .. G06F 11/1433; G06F 8/654; G06F 11/1417; G06F 8/65
See application file for complete search history.

(56) References Cited

U.S. PATENT DOCUMENTS

| | | | | |
|---|---|---|---|---|
| 7,797,693 | B1* | 9/2010 | Gustafson | G06F 11/1433 711/100 |
| 7,810,088 | B2* | 10/2010 | Herle | H04M 1/72406 717/173 |
| 7,971,199 | B1* | 6/2011 | Chen | G06F 8/654 709/221 |
| 9,760,461 | B2* | 9/2017 | Nitta | G06F 11/2284 |
| 10,324,706 | B1* | 6/2019 | Schrader | G06F 9/4416 |
| 2003/0140247 | A1* | 7/2003 | Marin | H04L 63/10 726/3 |
| 2019/0339963 | A1* | 11/2019 | Kurosawa | B60W 50/0205 |
| 2020/0356671 | A1* | 11/2020 | Li | G06F 8/654 |
| 2021/0042035 | A1* | 2/2021 | Futagi | G06F 21/74 |

FOREIGN PATENT DOCUMENTS

JP 2013109450 A 6/2013

* cited by examiner

*Primary Examiner* — Daxin Wu
(74) *Attorney, Agent, or Firm* — ROSSI, KIMMS & McDOWELL LLP

(57) ABSTRACT

An information processing apparatus comprises a volatile memory and a non-volatile storage capable of storing a main firmware for causing the information processing apparatus to realize the predetermined function and a communication firmware for booting. The information processing apparatus accesses a predetermined server using the communication firmware, obtains recovery firmware, and loads the recovery firmware into a volatile memory. Further, the information processing apparatus obtains an updated main firmware from the predetermined server using the loaded recovery firmware, and updates the main firmware stored in the non-volatile storage.

11 Claims, 14 Drawing Sheets

FIG. 12

◆ REQUEST FOR AUTHENTICATION BY SERIAL NUMBER

```
POST https://fw-server01.xxxx.com/mfxxxx/SerialTarget.do;id=OTUwMzQ4NTI4 HTTP/1.1\r\n
"serialid" = "SNO1111"\r\n
"action" = "authent"\r\n
```

FIG. 13

◆ LATEST NORMAL FIRMWARE URI AND URI FOR DOWNLOAD-SPECIFIC RECOVERY FIRMWARE OBTAINMENT REPORT

```
<?xml version="1.0" encoding="UTF-8" ?>
<update-information>
<header>
<information version="0001" />
</header>
<body>
    <div id="container">\r\n
        <content ="0;uri=http://fw-server01.xxxx.com/mfxxxx/6/0400003246/11/mfxxxx_MainController_V04.08.bin">\n
        <content ="X;uri=http://fw-server01.xxxx.com/mfxxxx/8/0400006198/01/mfxxxx_recovery.bin">\n
    </div>
</body>
</update-information>
```

6010

6020

6001

5001

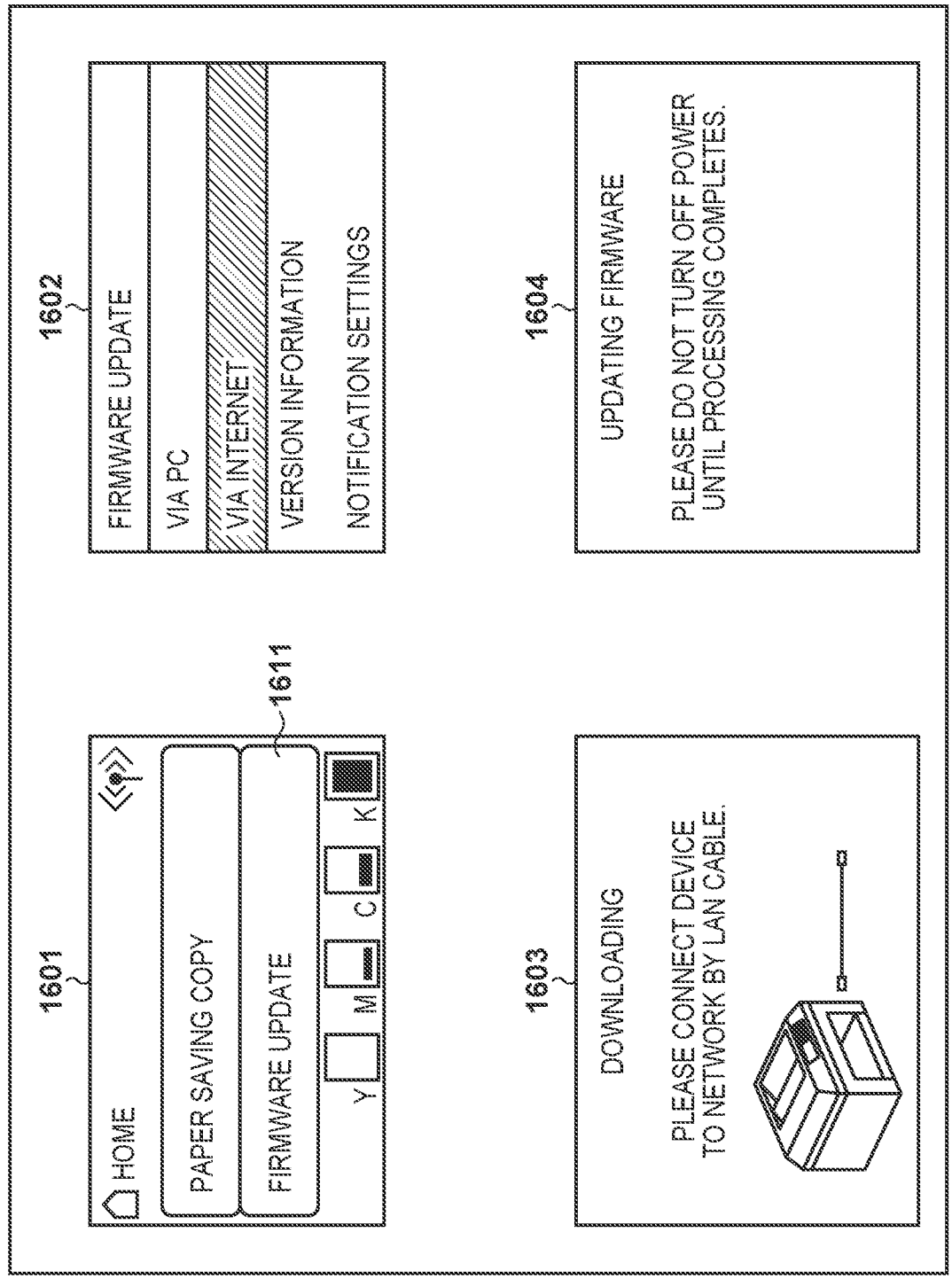

INFORMATION PROCESSING APPARATUS THAT PERFORMS PROGRAM RECOVERY USING LIMITED STORAGE SPACE, METHOD FOR CONTROLLING THE SAME AND STORAGE MEDIUM

BACKGROUND OF THE INVENTION

Field of the Invention

The present invention relates to an information processing apparatus, a method for controlling the same, and a storage medium.

Description of the Related Art

Firmware for controlling an information processing apparatus such as an image processing apparatus is updated as needed to add a function or the like. The information processing apparatus obtains new firmware from an external device connected via a network, and updates the firmware stored in the flash memory to the obtained latest firmware. However, if the firmware update is not completed normally, the electronic device such as the image processing apparatus is in a malfunction state in which it does not activate normally. Japanese Patent Laid-Open No. 2013-109450 proposes a technique for recovery of firmware that has failed to be updated.

However, the above-described conventional technique has the problem described below. For example, in the above-described conventional technique, the storage of the information processing apparatus holds two firmwares, a normal firmware and a firmware for recovery, to realize recovery. According to such a configuration, when one firmware malfunctions, a recovery process can be easily executed by the other firmware which is not failing. However, while the recovery is easy, it is necessary to secure a large-capacity storage for recovery, which leads to an increase in cost.

SUMMARY OF THE INVENTION

The present invention enables realization of a mechanism that facilitates program recovery with a limited storage capacity.

One aspect of the present invention provides an information processing apparatus having a predetermined function, the apparatus comprising: a volatile memory; a non-volatile storage capable of storing a main firmware for causing the information processing apparatus to realize the predetermined function and a communication firmware for booting; an obtaining unit configured to access a predetermined server using the communication firmware, obtain a recovery firmware, and load the recovery firmware into the volatile memory; and a recovery unit configured to obtain from the predetermined server an updated main firmware by using the loaded recovery firmware and to update the main firmware stored in the non-volatile storage.

Another aspect of the present invention provides a method for controlling an information processing apparatus comprising a volatile memory and a non-volatile storage capable of storing a main firmware for causing the information processing apparatus to realize a predetermined function and a communication firmware for booting, the method comprising: an obtaining unit accessing a predetermined server using the communication firmware, obtaining a recovery firmware, and loading the recovery firmware into the volatile memory; and a recovery unit obtaining from the predetermined server an updated main firmware using the loaded recovery firmware and updating the main firmware stored in the non-volatile storage.

Still another aspect of the present invention provides a non-transitory computer-readable storage medium storing a computing program for causing a computer to execute each step in a method for controlling an information processing apparatus comprising a volatile memory and a non-volatile storage capable of storing a main firmware for causing the information processing apparatus to realize a predetermined function and a communication firmware for booting, the method comprising: accessing a predetermined server using the communication firmware, obtaining a recovery firmware, and loading the recovery firmware into the volatile memory; and obtaining from the predetermined server an updated main firmware using the loaded recovery firmware and updating the main firmware stored in the non-volatile storage therewith.

Further features of the present invention will become apparent from the following description of exemplary embodiments (with reference to the attached drawings).

BRIEF DESCRIPTION OF THE DRAWINGS

FIG. 12 is a diagram illustrating an example of information for making an authentication request according to an embodiment.

FIG. 13 is a diagram illustrating an example of an obtainment report 1007 about obtaining a URI of a firmware storage location according to an embodiment.

FIG. 16 is a diagram illustrating an example of screens to be displayed on an operation unit of the MFP 100 according to an embodiment.

DESCRIPTION OF THE EMBODIMENTS

Figure 1:
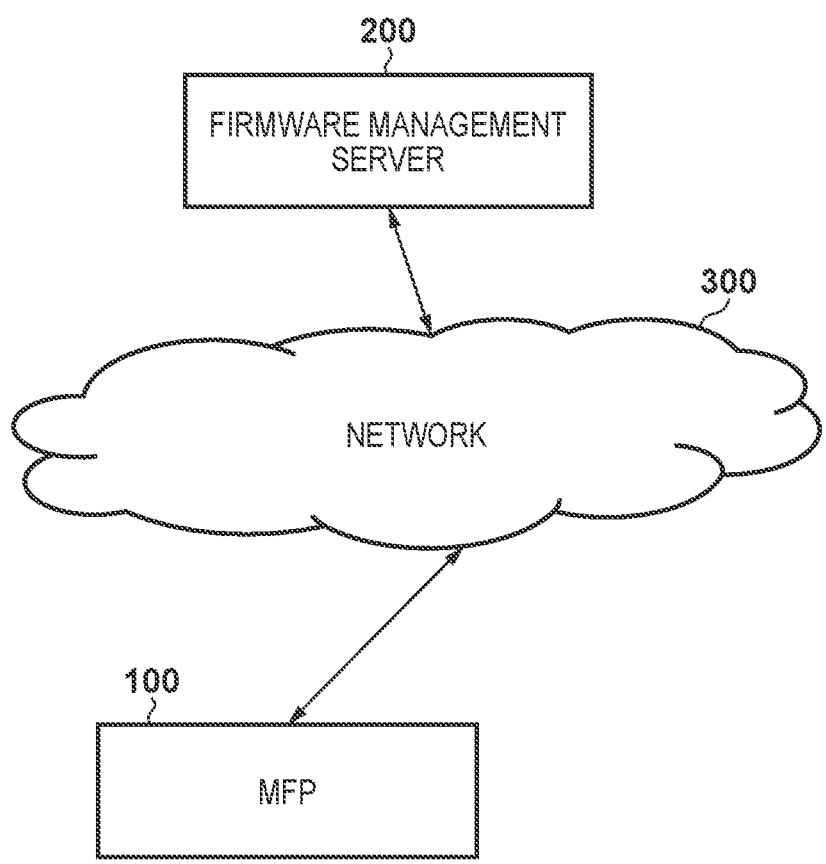
FIG. 1 is a diagram illustrating an example of a system configuration according to an embodiment.

Hereinafter, embodiments will be described in detail with reference to the attached drawings. Note, the following embodiments are not intended to limit the scope of the claimed invention. Multiple features are described in the embodiments, but limitation is not made to an invention that requires all such features, and multiple such features may be combined as appropriate. Furthermore, in the attached drawings, the same reference numerals are given to the same or similar configurations, and redundant description thereof is omitted.

First Embodiment

<System Configuration>

First, a configuration of an information processing system according to the present embodiment will be described with reference to FIG. 1. The system has a system configuration in which an MFP 100, which is an information processing apparatus (image forming apparatus), and a firmware management server 200, which manages and distributes updated firmware, are connected to each other via a network 300. Here, the MFP 100 and the firmware management server 200 are described as each being a single device, but they may be multiple devices. Further, the configuration may include other server apparatuses. Details of the respective apparatuses will be described later.

<Configuration of Image Forming Apparatus (Information Processing Apparatus)>

Figure 2:
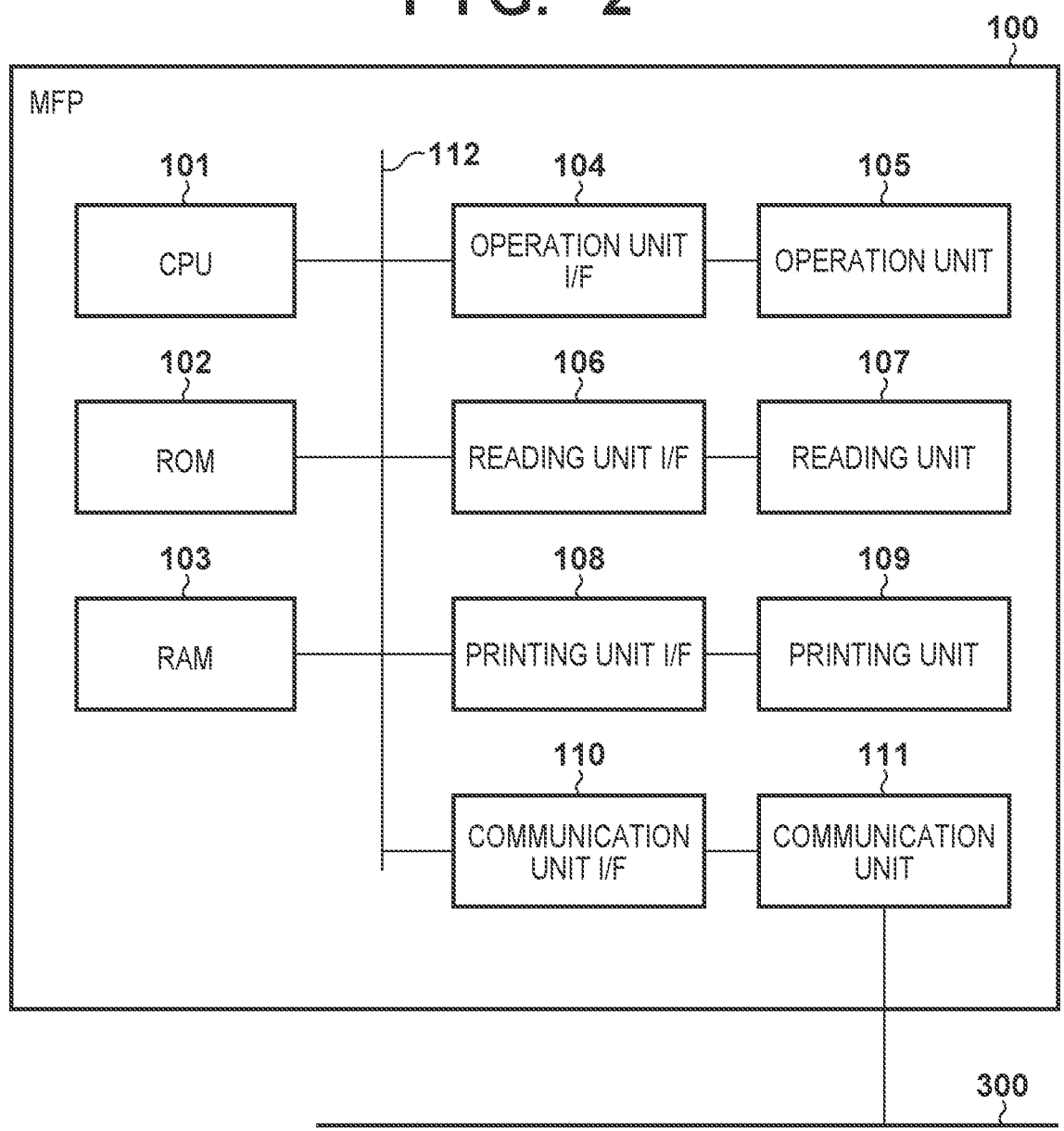
FIG. 2 is a diagram illustrating an exemplary hardware configuration of an MFP 100 according to an embodiment.

Next, referring to FIG. 2, an exemplary hardware configuration of the MFP 100 which is an image forming apparatus (information processing apparatus) will be described. Here, a Multi Function Peripheral (MFP) will be described as an example of an information processing apparatus suitable for application of the present embodiment. However, the present invention can also be applied to an information processing apparatus that realizes other functions. The MFP 100 includes a Central Processing Unit (CPU) 101, a Read-Only Memory (ROM) 102, a Random Access Memory (RAM) 103, an operation unit I/F 104, and an operation unit 105. Further, the MFP 100 includes a reading unit I/F 106, a reading unit 107, a printing unit I/F 108, a printing unit 109, a communication unit I/F 110, and a communication unit 111. The devices can exchange data with each other via a system bus 112 and are controlled by the CPU 101.

The CPU 101 reads programs stored in the ROM 102 into the RAM 103 and executes the programs, thereby controlling the devices comprehensively and realizing various functions. The ROM 102 stores programs responsible for various kinds of control of the MFP 100 and various kinds of data (fonts and image data) required for interactive control with the user via the operation unit 105. In the present disclosure, the ROM 102 is constituted by a flash memory (flash ROM). The ROM 102 stores firmware (normal firmware) for controlling the MFP 100, a firmware update program for updating the firmware to new firmware, and the like. The RAM 103 is a main memory, and is used as a work area for image data and a temporary storage region for loading various control programs stored in the ROM 102.

The operation unit I/F 104 controls the operation unit 105, which includes, for example, a display unit such as a touch panel and hardware keys. The operation unit 105 displays information to the user and detects an input from the user. The reading unit I/F 106 controls the reading unit 107, which is a scanner, for example. The reading unit 107 is a scanner that reads an image of a paper document. The CPU 101 converts an image read by the reading unit 107 into image data such as binary data. The image data generated based on the image read by the reading unit 107 as described above is transmitted to an external device or printed on a recording sheet. The printing unit I/F 108 controls the printing unit 109, which is a printer, for example. The CPU 101 transfers the image data (print data) stored in the RAM 103 to the printing unit 109 via the printing unit I/F 108. The printing unit 109 prints an image based on the transferred image data on a recording sheet fed from the sheet feeding cassette.

The communication unit I/F 110 is an I/F for controlling the communication unit 111, and performs data communication with the network 300 via the communication unit 111. The communication unit I/F 110 controls the communication unit 111 and transmits image data held by the MFP 100 and various device information to an external device on the network 300. The communication unit I/F 110 controls the communication unit 111 and receives various types of information required for controlling print data and the MFP 100 from a mobile terminal (not shown) or an information processing terminal (not shown) on the network 300. In the present embodiment, it is assumed that data required for a firmware update is transmitted/received to/from the firmware management server 200 by HTTP communication.

In the MFP 100 according to the present embodiment, one CPU 101 executes the respective processes shown in the flowcharts described later using one memory (the RAM 103), but the present disclosure is not limited thereto. For example, a plurality of CPUs, RAMs, ROMs, and storages can cooperate to execute respective processes illustrated in the flowcharts described later. In addition, some processes may be executed by using hardware circuitry such as an Application Specific Integrated Circuit (ASIC) or a Field Programmable Gate Array (FPGA).

<Configuration of the Firmware Management Server>

Figure 3:
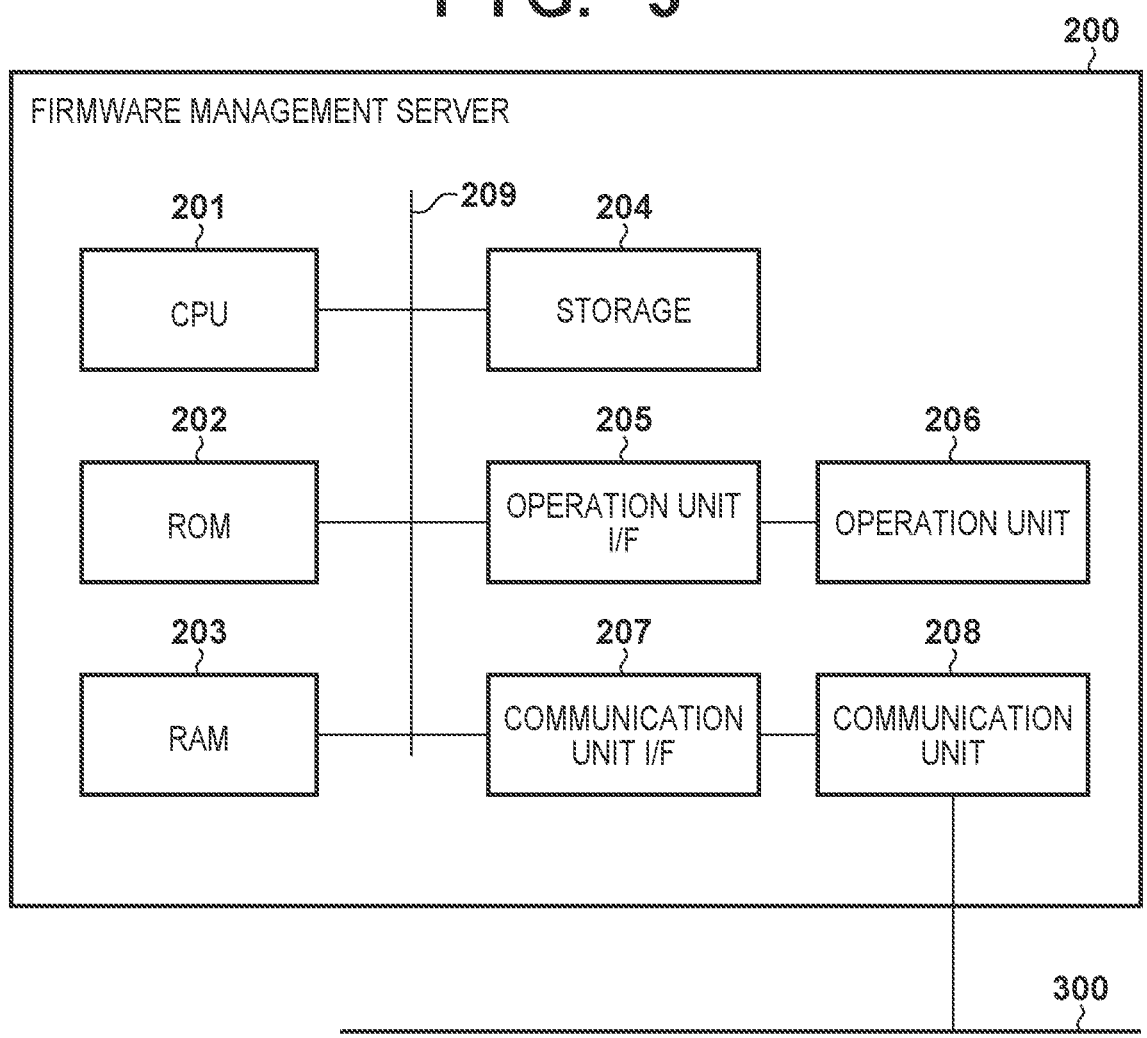
FIG. 3 is a diagram illustrating an exemplary hardware configuration of a firmware management server 200 according to an embodiment.

FIG. 3 is a diagram illustrating an exemplary hardware configuration of the firmware management server 200. The firmware management server 200 includes a CPU 201, a ROM 202, a RAM 203, a storage 204, an operation unit I/F 205, an operation unit 206, a communication unit I/F 207, and a communication unit 208. The devices can exchange data with each other via a system bus 209 and are controlled by the CPU 201.

The CPU 201 reads a control program stored in the ROM 102 and executes various processes for controlling the operation of the firmware management server 200. The ROM 102 stores a program for controlling a firmware management server 200 and various control programs included in the firmware update. The RAM 203 is used as a temporary storage region such as a main memory or a work area of the CPU 201. The storage 204 stores configuration information of the firmware management server 200, update firmware of a plurality of models, and the like.

The operation unit I/F 205 controls the operation unit 206, which includes, for example, a display unit such as a touch panel and hardware keys. The operation unit 206 performs, for example, information display to the server administrator, various setting inputs from the server administrator, and the like. The communication unit I/F 207 controls the communication unit 208 to perform data communication with the network 300.

<Firmware Update Sequence>

Next, referring to FIG. 4, a sequence in which the MFP 100 which is an information processing apparatus and the firmware management server 200 cooperate to update the firmware of the MFP 100 will be described. Communication between the MFP 100 and the firmware management server 200 is performed by exchanging information in a known method called RESTful API, and details of the information exchanged therebetween will be described later with reference to FIG. 11, FIG. 12, FIG. 13, and the like, as needed. When executing this sequence, the MFP 100 is controlled by the CPU 101 executing normal firmware 2102 of FIG. 7, and the firmware management server 200 is controlled by the CPU 201. Note that this sequence indicates a normal update processing sequence by the normal firmware. Although details will be described later, in the present embodiment, a recovery process is performed when the latest firmware update is not completed normally in the sequence described below.

In step S1001, the CPU 101 receives an instruction to update the firmware of the MFP 100 via the operation unit 105 of the MFP 100. When the firmware update is instructed by the operation unit 105, the CPU 101 activates firmware update control in the normal firmware 2102 of FIG. 8, and controls and executes the following MFP 100 sequence.

Here, referring to FIG. 16, an example of firmware update screens displayed on the operation unit 105 of the MFP 100 will be described. Reference numeral 1601 denotes a home screen of the MFP 100 (a portal screen displayed first when the power is turned on). The screen 1601 includes a button 1611 for instructing by user operation to update the normal firmware 2102 operating in the MFP 100. Reference numeral 1602 denotes a screen for instructing a firmware update displayed on the setting screen of the menu of the MFP 100. On the screen 1602, it is possible to select firmware update via the PC, firmware update via the Internet, version information confirmation, and notification settings. Here, firmware update via the Internet means that the firmware is updated by communicating with the firmware management server 200 as in a case where the button 1611 is selected via the screen 1601 by a user operation. Updating the firmware through a PC refers to updating the normal firmware that operates in the MFP 100 by using firmware stored in a local directory of the PC. In the present embodiment, a firmware update is instructed by operating the screens 1601 and 1602. However, the present invention is not limited thereto, and configuration may be such that the apparatus communicates with the firmware management server 200 to confirm as appropriate the presence or absence of a firmware update, as a firmware update trigger, and an update instruction may be automatically issued when an update is confirmed to be present.

Figure 4:
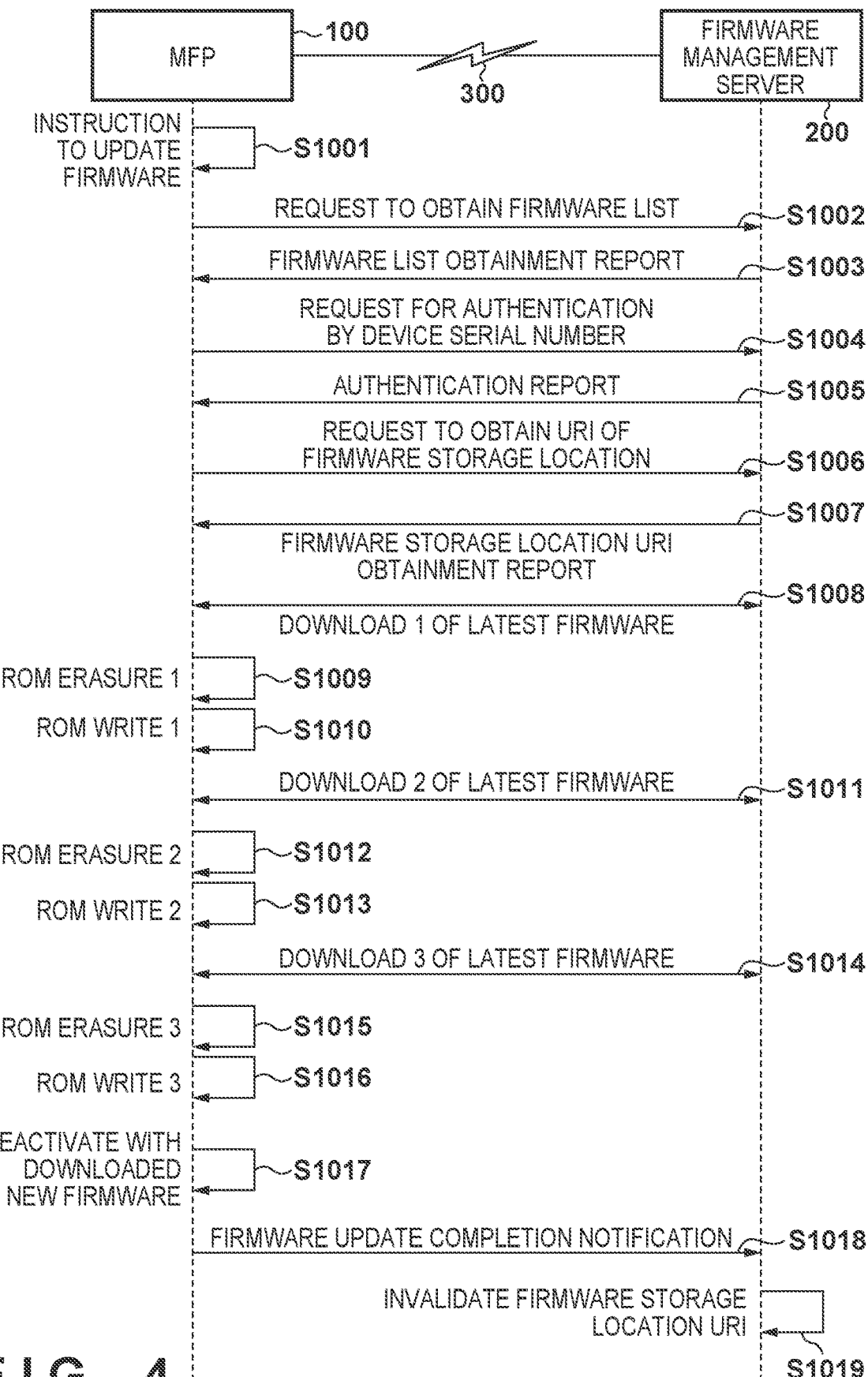
FIG. 4 is a sequence diagram illustrating a process for updating firmware of the MFP 100 and reactivating according to an embodiment.

The description of FIG. 4 is returned to. In step S1002, the CPU 101 makes a request to the firmware management server 200 to obtain the update firmware list. Specifically, the CPU 101 transmits an HTTP GET request denoted by reference numeral 3001 of FIG. 11 to the firmware management server 200 to make an obtainment request.

Next, in step S1003, the CPU 201 of the firmware management server 200 returns, from the firmware stored in the storage 204, a list of firmware applicable to the MFP 100 requested in step S1002 above. Specifically, the CPU 201 returns the firmware list shown in reference numeral 4001 in FIG. 11 to the MFP 100. In reference numeral 4001, the <content . . . > to </content> (reference numeral 4010) between <contents-information> and </contents-information> indicates that version "04.08" is present. In other words, in the example of FIG. 11, in step S1003, information indicating that version 04.08 is present is returned as a response to the step S1002 request.

Next, in step S1004, the CPU 101 makes a request to the firmware management server 200 for authentication using a serial number allocated to each MFP 100 in order to authenticate that the electronic device is legitimate and has not been tampered with. This serial number is text that is written to the ROM 102 of the MFP 100 in a factory manufacturing process, and is assigned to uniquely identify each MFP. Specifically, the CPU 101 transmits an HTTP POST command denoted by reference numeral 5001 of FIG. 12 to the firmware management server 200 to request execution of the serial number authentication. In the example of FIG. 12, the parameters '"serialid"="SNO11111"\r\n' and '"action"="authent"\r\n' attached to the POST command instruct authentication. Specifically, the authentication using the serial number (serialid, "SNO11111") of the MFP 100 is instructed. However, there is no intention to limit the present invention, and other parameters and instruction methods may be applied as appropriate in the present invention.

In step S1005, the CPU 201 notifies the MFP 100 of the authentication report. When it is notified that the authentication has succeeded, in step S1006, the CPU 101 makes a request to the firmware management server 200 to obtain a URI (Uniform Resource Identifier: storage destination information) that is a storage location of the updated firmware. In step S1007, the CPU 201 confirms the storage 204, sets a URI which is the storage location for the MFP 100 update firmware and a download-specific recovery firmware URI for a case where an update does not complete normally, and notifies these to the MFP 100. A detailed description of an obtainment report notified by the firmware management server 200 to the MFP 100 in step S1007 will be described later with reference to FIG. 13.

Here, referring to FIG. 13, an example in which the firmware management server 200 notifies the MFP 100 in step S1007 will be described. In step S1007, the information indicated by reference numeral 6001, for example, is notified to the MFP 100 from the firmware management server 200. Reference numeral 6001 includes information of reference numerals 6010 and 6020. Reference numeral 6010 has the information "<content="0;uri=http://fw-server01.xxxx.com/mfxxxx/6/0400003246/11/mfxxxx_MainController_V04.08.bin">\n". The text "MainController" in this information indicates normal firmware. The "fw-server01.xxxx.com" indicates the address of the firmware management server 200. "mfxxxx/6/0400003246/11/mfxxxx_MainController_V04.08.bin" indicates a filename on the storage 204 of the firmware management server 200 illustrated in FIG. 5. Also, reference numeral 6020 has the information "<content="X;uri=http://fw-server01.xxxx.com/mfxxxx/8/0400006198/01/mfxxxx_recovery.bin">\n". The "recovery" in this information indicates that it is the download-specific recovery firmware. Similarly to reference numeral 6010, the "fw-server01.xxxx.com" indicates the address of the firmware management server 200. "mfxxxx/8/0400006198/01/mfxxxx_recovery.bin" indicates a filename on the storage 204 of the firmware management server 200 of FIG. 5. Details of FIG. 5 will be described later.

Figure 6:
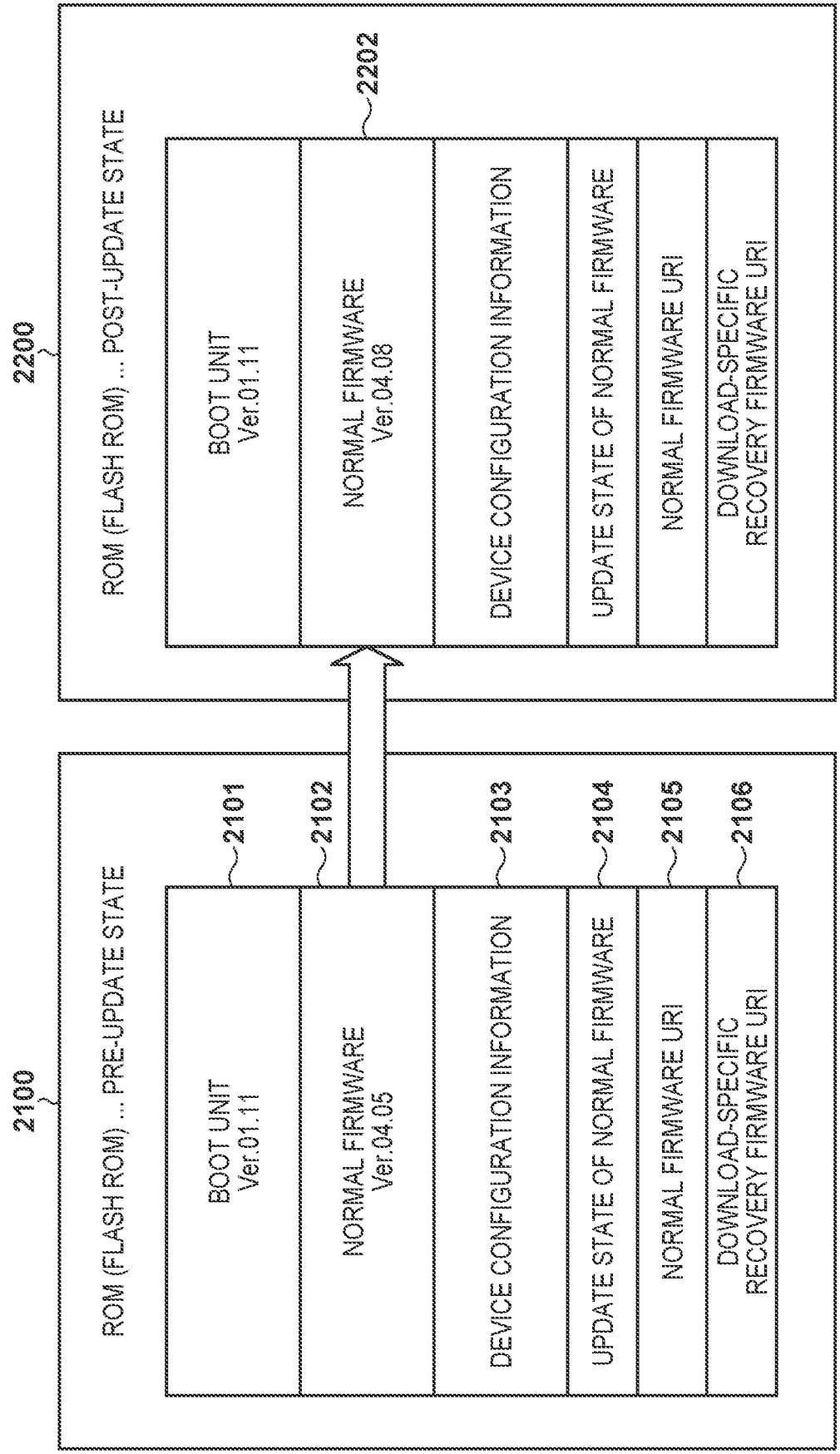
FIG. 6 is a diagram illustrating an example of a configuration of a ROM 102 according to an embodiment.

The URI of the update firmware notified in step S1007 is written in a normal firmware URI 2105 in FIG. 6 and held. A URI which is a storage location for download-specific recovery firmware is written and held in download-specific recovery firmware URI 2106 in FIG. 6. The recovery firmware is firmware that is executed when the normal firmware update is not completed normally in the normal update processing sequence that is the present sequence.

Thereafter, the MFP 100 downloads the firmware and erases and writes the storage region using the URI of the update firmware notified in step S1007 (URI in 6010 of FIG.

13). Specifically, in step S1008, step S1011, and step S1014, the CPU 101 divides the update firmware into three pieces and downloads them from the firmware management server 200. In addition, in step S1009, step S1012 and step S1015, the CPU 101 electrically erases the ROM 102 (Flash ROM configuration) to the states 701, 703, and 705 in FIG. 7 in order to set a state in which the update firmware can be written. In addition, in step S1010, step S1013 and step S1016, the CPU 101 writes the downloaded update firmware to the corresponding location of the ROM 102 (a configuration according to a Flash ROM).

By executing the above sequence, the firmware of Ver04.05 shown in reference numeral 2102 of FIG. 6 is rewritten with Ver04.08 shown in reference numeral 2202 by the update firmware. In the present embodiment, for the sake of convenience, configuration is such that each of three divisions is downloaded and updated, but the invention is not particularly limited to this, and any number of downloads and updates may be performed depending on the communication performance and the memory performance.

Immediately before erasing the stored content of the ROM 102 in step S1009, "writing in progress", which indicates that the normal firmware is being written, is written to an update state 2104 of the normal firmware in FIG. 6. Then, immediately before reactivating with the downloaded new firmware in step S1017, the update state 2104 of the normal firmware in FIG. 6 is rewritten from "writing in progress" to "idle state". As a result, it is possible to keep the device in a normal state rather than a malfunction state. The above-described rewriting operation includes a method of alternately performing downloading and rewriting, and a method of rewriting after downloading the firmware into the RAM 203 has completed, and the like, but the method of writing and downloading is not limited thereto. In addition, when the update of the normal firmware is not correctly completed due to a power-off of the MFP 100 or a communication error or the like while "writing in progress", a recovery process to be described later is executed. Details of the recovery process will be described later.

Then, in step S1017, the CPU 101 performs a reboot operation when the rewriting of the area of the normal firmware stored in the ROM 102 with the newest firmware has been completed. The ROM 102 of the MFP 100 confirms the update state 2104 of the normal firmware in FIG. 6, and performs a reactivation with the normal firmware in the case of the "idle state". In the present embodiment, when reference numeral 2104 is not idle, it is determined that a non-operating malfunction state is occurring. Note that the reactivation need not be automatic, and may be performed by having the user turn the power OFF/ON.

When the MFP 100 is reactivated, in step S1018, the CPU 101 notifies the firmware management server 200 that the firmware update has been completed. In step S1019, when the CPU 201 receives the firmware update completion notification, the CPU 201 invalidates the update firmware URI notified in step S1007 and ends this sequence normally.

<Configuration of Update Firmware>

Figure 5:
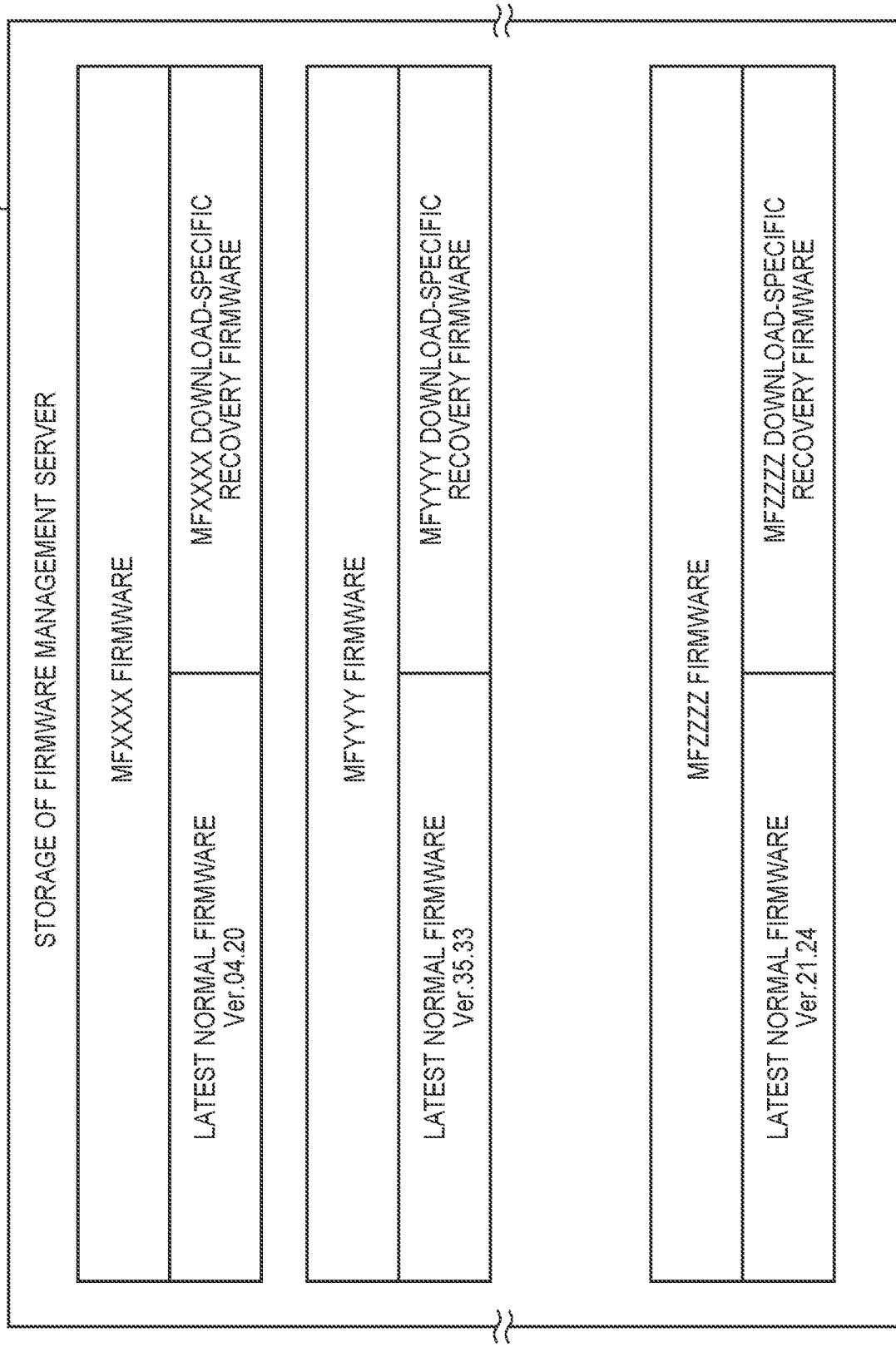
FIG. 5 is a diagram illustrating an exemplary configuration for update firmware stored in the firmware management server 200 according to an embodiment.

Next, a configuration example of the update firmware stored in the storage 204 of the firmware management server 200 according to the present embodiment will be described with reference to FIG. 5.

Reference numeral 2001 denotes a partial region of the storage 204, and the region 2001 stores firmware of a plurality of MFPs, for example, firmware of a MFXXXX, MFYYYY, and MFZZZZ. In MFXXXX, updated normal firmware and download-specific recovery firmware are held as a pair. In MFYYYY and MFZZZZ, similarly, normal firmware and the download-specific recovery firmware are held as a pair.

Referring now to FIG. 13, the URI of the firmware obtained in step S1007 for MFXXXX shown in FIG. 5 will be described. As described above, the URI obtainment report 6001 obtained in step S1007 includes information 6010 of a normal update firmware and information 6020 of download-specific recovery firmware. It can be seen from the information of reference numeral 6010 that the normal update firmware is stored in the firmware management server 200 having the host name of fw-server01.xxxx.com. In addition, it can be seen that the normal update firmware is stored under the filename mfxxxx_MainController_V04.08.bin. In addition, it can be seen from the information of reference numeral 6020 that the download-specific recovery firmware is similarly stored in the firmware management server 200, and is stored with the filename of mfxxxx_recovery.bin.

As described above, according to the present embodiment, the firmware management server 200 holds the normal firmware for each MFP and the download-specific recovery firmware for downloading the normal firmware as a pair. Thus, each MFP does not need to hold sophisticated firmware for securely downloading normal firmware in advance, and only needs to have a simple communication function for downloading the above-described recovery firmware. Therefore, when normal firmware is downloaded, a download-specific recovery firmware is first downloaded by a simple communication function, and the normal firmware is downloaded by secure communication using the downloaded firmware. Therefore, since it is not necessary to hold sophisticated firmware for communication in advance, it is possible to reduce the memory size.

<Configuration of ROM>

Next, referring to FIG. 6, an example of a configuration of the ROM 102 of the MFP 100 according to the present embodiment and the states before and after updating the normal firmware will be described. Reference numeral 2100 denotes a storage state of the ROM 102 prior to updating the normal firmware. Reference numeral 2200 denotes a storage state of the ROM 102 after updating the normal firmware. In FIG. 6, blocks 2100 and 2200 are shown as separate blocks for ease of explanation, but these illustrate the contents of the same storage region.

The ROM 102 stores a boot unit 2101, the normal firmware 2102, device configuration information 2103, the normal firmware update state 2104, the normal firmware URI 2105, and the download-specific recovery firmware URI 2106. Also, as denoted by reference numerals 2100 and 2200, before and after updating, Ver04.05 of the normal firmware 2102 is updated to Ver04.08 of the normal firmware 2202. That is, the stored content of the ROM 102 is rewritten from reference numeral 2100 to 2200 by updating the firmware.

The version of the firmware according to the present embodiment is composed of a major version and a minor version, which is the two lower-order digits, and the larger the numerical value, the newer the firmware is. Specifically, in Ver04.05 of the normal firmware 2102, "04" indicates the major version, and the lower-order two digits "05" indicate the minor version. Also, since the numerical value of Ver04.08 of the normal firmware 2202 is larger than that of Ver04.05 of the normal firmware 2102, it indicates that the normal firmware 2202 is newer firmware.

The normal firmware URI 2105 and download-specific recovery firmware URI 2106 are regions for holding information notified from the firmware management server 200 in the above-described step S1008. The update state 2104 of the normal firmware is information updated in the above-described step S1008, and either of the information "idle state" and "writing in progress" is written. It is assumed that "writing in progress" indicates that the firmware is being updated, and when the update is completed, "idle state" is set.

<Memory Transition>

Next, with reference to FIG. 7, details of the memory transition until the normal firmware 2102 according to the present embodiment is rewritten to the normal firmware 2202 will be described.

From the pre-update normal firmware 2102 shown in FIG. 6, the state of 701 is entered by the ROM erasure 1 of step S1009 above. Here, the number shown at the end of the ROM erasure indicates the processing on one division among three divisions of the normal firmware. The same applies to the update firmware described below. Subsequently, ROM-write 1 of the above step S1010 writes the latest firmware 1 downloaded in step S1008 above and state 702 is entered.

Figure 7:
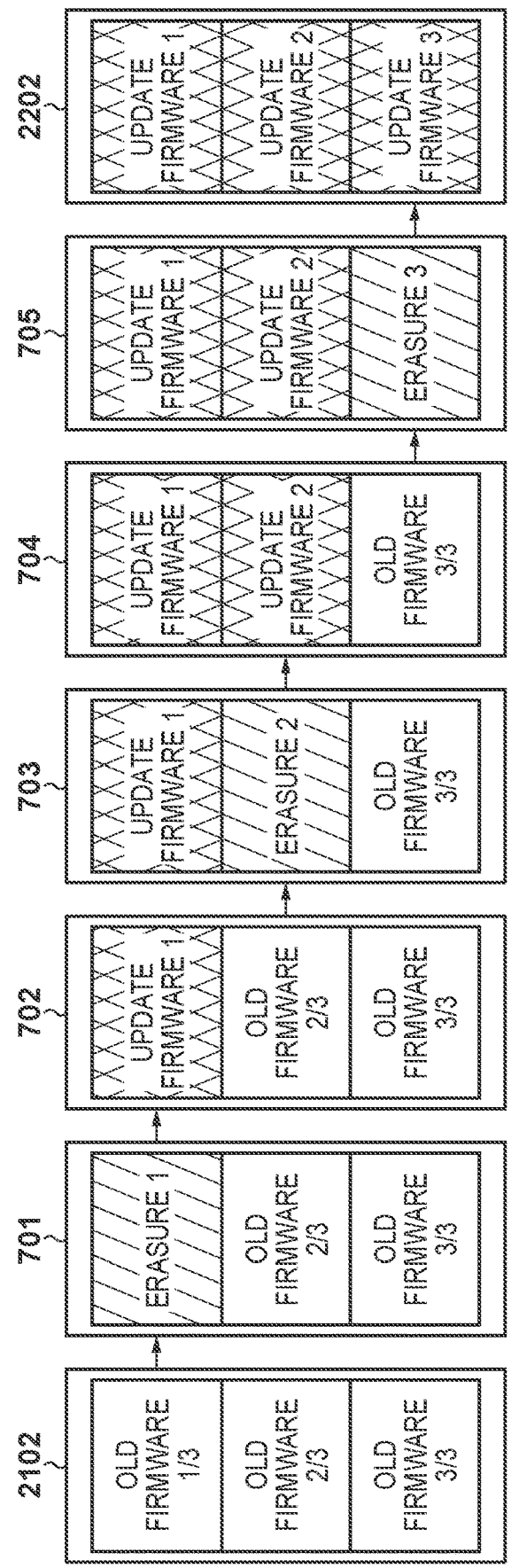
FIG. 7 is a diagram illustrating a change in a memory state of the ROM 102 according to an embodiment.

By the repeated erasure and writing in step S1012, step S1013, step S1015, and step S1016, the update to state 2202 in FIG. 7 is performed. The states of 2102 and 2202 illustrated in FIG. 7 are states in which normal firmware is not missing and operation is normal. On the other hand, the states of 701 to 705 indicate states in which normal firmware is missing, and indicate a malfunction state. Although not shown here, a completely erased state of erasure 1, erasure 2, and erasure 3 is also a malfunction state.

<Configuration of Normal Firmware>

Figure 8:
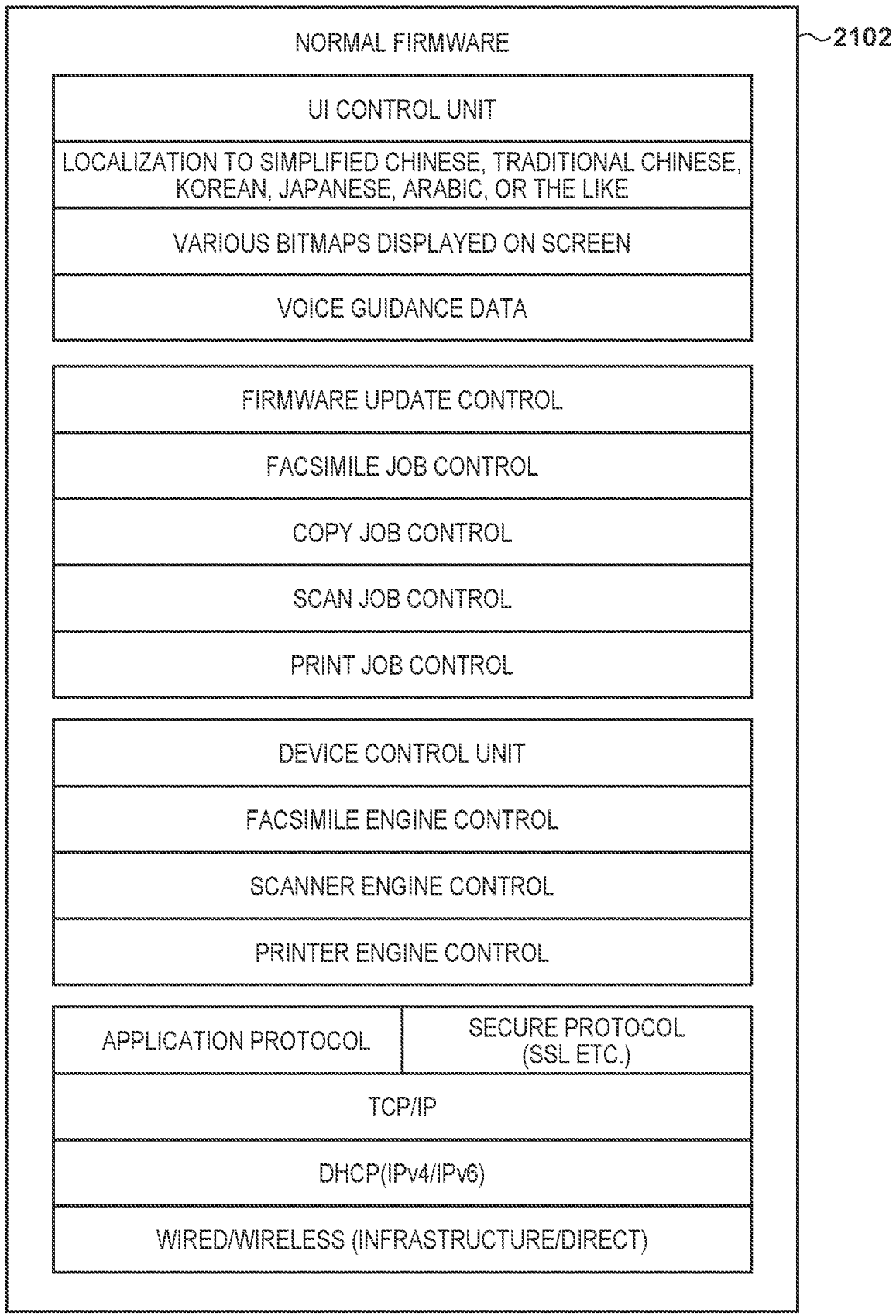
FIG. 8 is a diagram illustrating a software configuration of normal firmware according to an embodiment.

Next, referring to FIG. 8, a software configuration of normal firmware operating in the MFP 100 according to the present embodiment will be described. The normal firmware 2102 includes information necessary for a user I/F such as a UI control unit, language data, bitmaps, voice data, firmware update control, and facsimile/copy/scan/print job control. Further, the normal firmware 2102 includes a device control unit that controls power saving and the like, and portions for controlling engines of facsimile, scanning, and printing respectively. Further, the normal firmware 2102 includes application protocols (such as HTTP and IPP), security protocols, and a communication unit for TCP/IP, DHCP, and the like.

The UI control unit includes a program for controlling the operation unit 105 via the operation unit I/F 104. The language data includes data related to languages available in the MFP 100. The bitmaps include image data used for various screens displayed on the operation unit 105. The voice data includes data for voice guidance. The firmware configuration control includes a program required for updating the firmware. The facsimile job control includes a program for performing control related to facsimile transmission and facsimile reception. The copy job control includes a program that performs control when reading a document and printing a read image. The scan job control includes a program that performs control for reading a document and generating a read image. The print job control includes a program that executes printing in accordance with image data externally or internally obtained. The application protocols include protocol information related to HTTP and IPP. The secure protocols includes protocol information related to SSL, IPSEC, and the like. The communication unit includes information related to TCP/IP (IPv4, IPv6, and the like), DHCP, wired/wireless (infrastructure/direct) communication.

As described above, the normal firmware 2102 includes control programs, data, and the like related to functions provided by the MFP 100. In addition, an HTTP/HTTPS communication module or the like and a WEP or WPA cryptographic module or the like, which is for radio communication cryptography are required in the communication unit included in the normal firmware from the viewpoint of enhancing security. Here, it is difficult to hold in advance firmware having the above-described communication function for downloading normal firmware from the firmware management server 200 when updating the firmware in a device with a small storage region such as an inexpensive machine. Therefore, according to the present embodiment, a download-specific recovery firmware including the above-described cryptographic module or the like is obtained from the firmware management server 200 by using firmware having a simple configuration stored in advance in the MFP 100. Further, updated normal firmware is obtained from the firmware management server 200 by executing the obtained download-specific recovery firmware. As described above, it is only necessary to hold simple firmware having a small program size before updating the firmware, and it is possible to effectively use the memory resources.

<Download-Specific Recovery Firmware>

Figure 9:
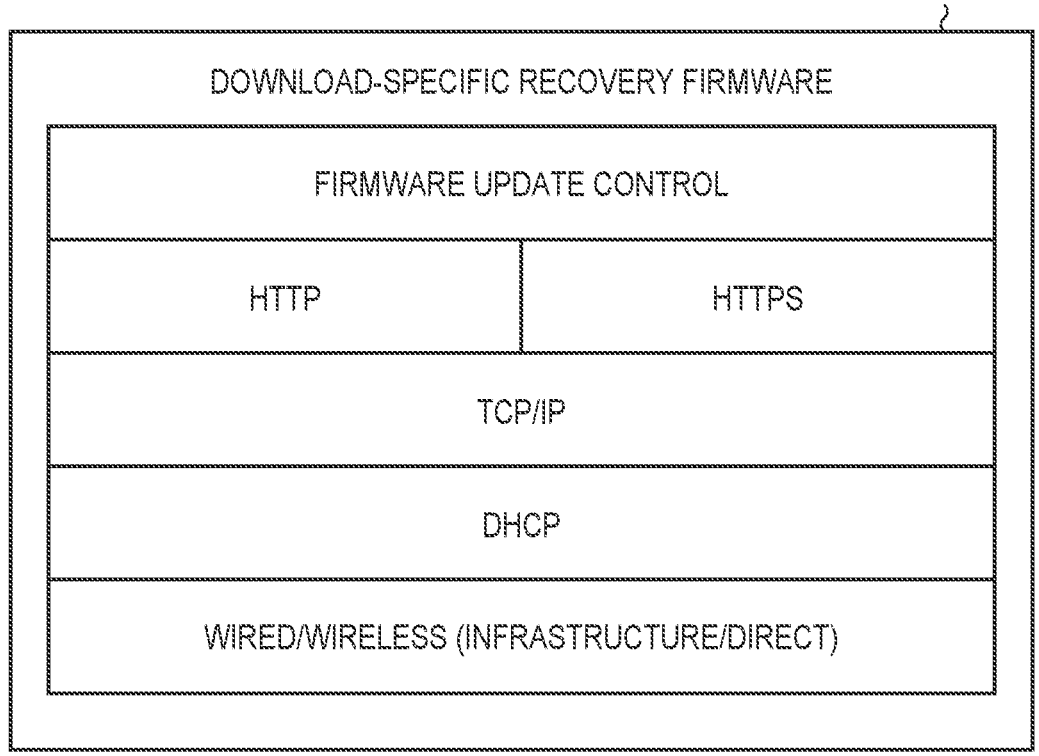
FIG. 9 is a diagram illustrating a software configuration of a download-specific recovery firmware according to an embodiment.

Next, referring to FIG. 9, a software configuration of the download-specific recovery firmware according to the present embodiment will be described. Download-specific recovery firmware 2400 is configured to include firmware update control and a communication unit. The communication unit has a function for downloading normal firmware from an external firmware management server 200 over HTTP/HTTPS on a wired or wireless LAN.

The firmware update control performs control for updating the normal firmware at the time of recovery. Specifically, the firmware update control is activated when the boot unit 2101 in FIG. 10 detects a malfunction (reference numeral 2104 in FIG. 6 has a value of "writing in progress"). The firmware update control stores in the RAM 103 the firmware from URI (reference numeral 2106 in FIG. 6) indicating storage location of download-specific recovery firmware. Thereafter, the firmware update control executes the download-specific recovery firmware on the RAM 103 and control is transferred. In the recovery firmware, in the above step S1008, the normal firmware is downloaded and updated based on the normal firmware URI stored in reference numeral 2105 of FIG. 6, and the recovery is completed. As described above, the download-specific recovery firmware 2400 has a function of downloading the update firmware from the firmware management server 200 and a function of updating the normal firmware with the downloaded update firmware.

<Configuration of Boot Unit>

Figure 10:
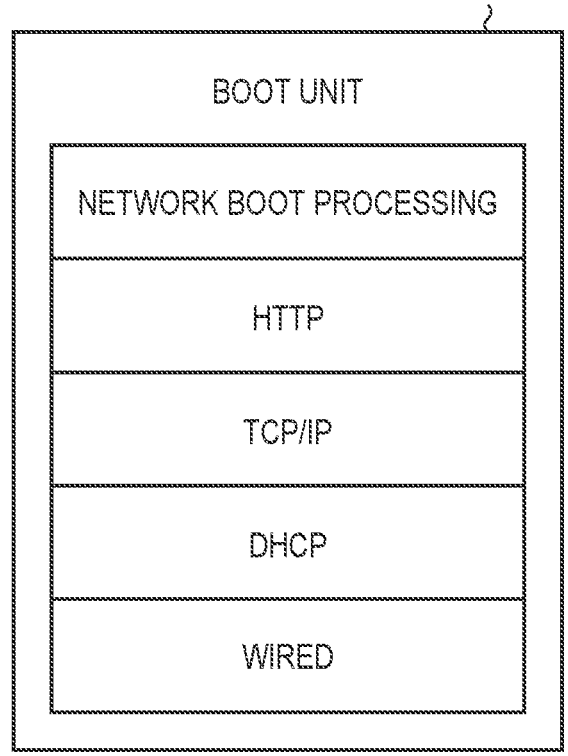
FIG. 10 is a diagram illustrating a software configuration of a boot unit according to an embodiment.

Next, referring to FIG. 10, a software configuration of a boot unit (BOOT) operating in the MFP 100 according to the present embodiment will be described. As described with reference to FIG. 6, the boot unit 2101 is stored in advance in the ROM 102.

The boot unit 2101 is a unit that the CPU 101 activates first when the MFP 100 is powered on. When executed, the boot unit 2101 initializes hardware and then activates the normal firmware 2102. In the present embodiment, an example will be described in which the boot unit 2101 is not an update target and updates only the normal firmware.

The boot unit 2101 comprises a network BOOT process for a case where a malfunction is detected and a communication unit necessary for the network BOOT. Compared with the download-specific recovery firmware 2400, the communication unit does not include an HTTPS communication module or the like, and has a simple configuration. The communication unit of the boot unit 2101 has a function of downloading a download-specific recovery firmware 2400 from the firmware management server 200 at the time of recovery when a malfunction is detected.

<Obtain Firmware List>

Figure 11:
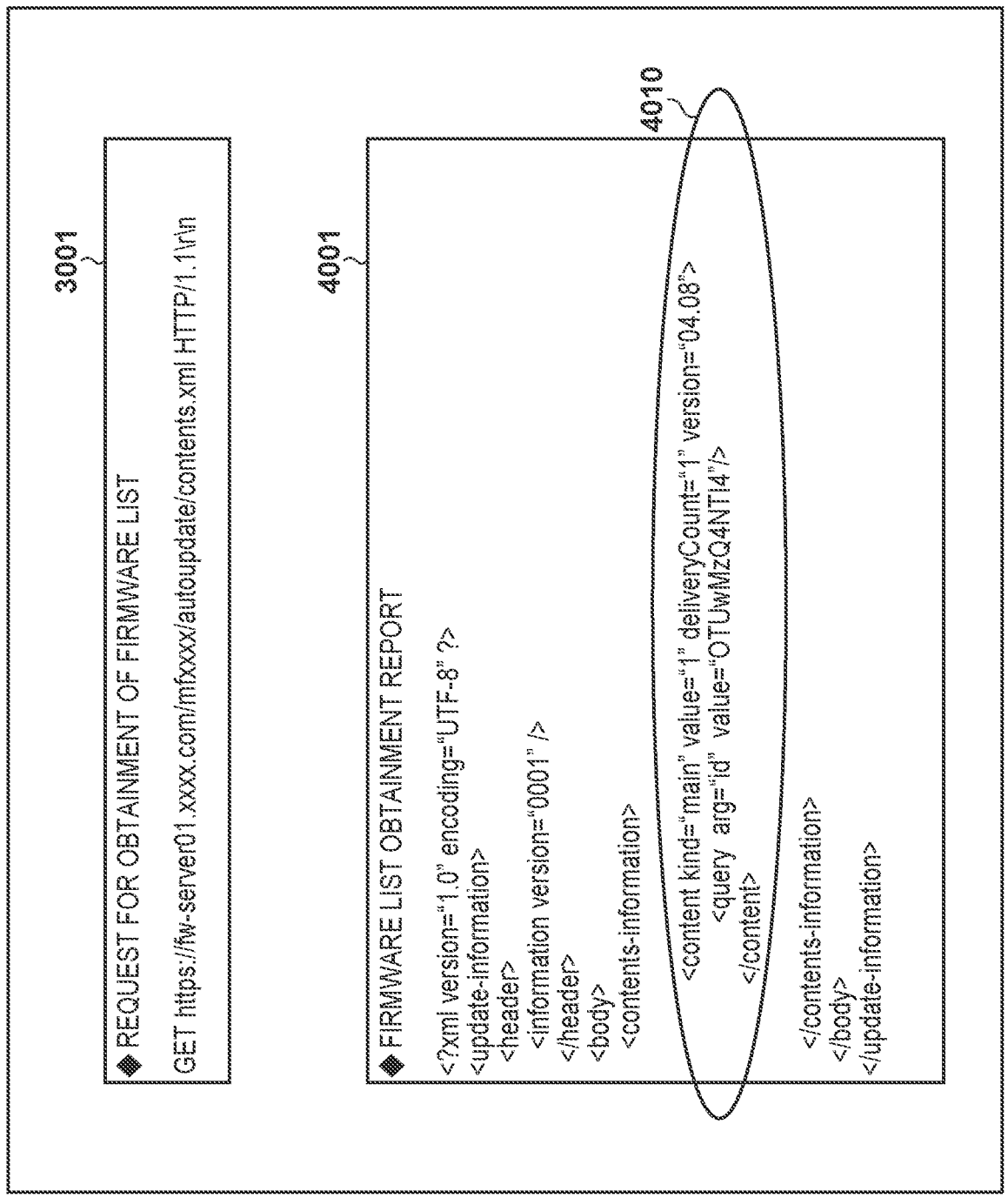
FIG. 11 is a diagram illustrating an example of information when a firmware list is obtained according to an embodiment.

Next, referring to FIG. 11, details of the firmware list obtainment request of step S1002 and the firmware list obtainment report of step S1003 will be described.

In step S1002, the MFP 100 indicates the content of the request to obtain the firmware list to the firmware management server 200 by an HTTP GET request 3001. The text "mfxxxx" in reference numeral 3001 indicates a request to obtain the firmware list related to "MFXXXX" in FIG. 4. That is, the identification information indicates one MFP of the plurality of MFPs. In response to this request, the firmware management server 200 returns the latest firmware list being managed.

In step S1003, the firmware management server 200 returns a list 4001 in response to the request 3001. 'kind="main"' in reference numeral 4010 and 'version="04.08"' in reference numeral 4010 in reference numeral 4001 indicate information for notifying the MFP 100 of the existence of normal firmware version "04.08".

<Authentication Request>

Next, referring to FIG. 12, details of the authentication request by serial number of step S1004 will be described. Reference numeral 5001 denotes an HTTP POST request that notifies the firmware management server 200 of the serial number (SNO11111) of the MFP 100. The parameters '"serialid"="SNO11111"\r\n"' and '"action"="authent"\r\n"' are attached to the POST command. These parameters instruct the MFP 100 to perform authentication using the serial number (serialid) of "SNO11111".

The firmware management server 200 manages serial numbers of respective electronic devices such as a MFXXXX, MFYYYY, and MFZZZZ. The managed serial numbers are manually inputted, for example, and stored and managed in the storage 204, for example, and are used at the time of a correctness determination at the time of a main authentication, as described above.

<Firmware Storage Location URI Obtainment Report>

Next, referring to FIG. 13, a detailed description will be given of an obtainment report about obtainment of the URI of the firmware storage location of step S1007. Reference numeral 6001 denotes an example of the obtainment report about obtainment of the URI of the firmware storage location. The obtainment report 6001 is information that the firmware management server 200 transmits in step S1007 in response to the request to obtain the URI of the firmware storage location performed by the MFP 100 in the above-described step S1006.

The obtainment report 6001 includes at least the information of reference numeral 6010 and 6020. The MFP 100, after having received the obtainment report 6001, determines that the firmware is update firmware for normal firmware from the text 'content="0;' and "MainController" in reference numeral 6010. The "fw-server01.xxxx.com" of reference numeral 6010 indicates the address of the firmware management server 200. "mfxxxx/6/0400003246/11/mfxxxx_MainController_V04.08.bin" indicates a filename on the storage 204 of the firmware management server 200 illustrated in FIG. 5.

In addition, the MFP 100 determines that the firmware is download-specific recovery firmware by the text 'content="X;' and "recovery" in reference numeral 6020. Also, similarly to reference numeral 6010, "fw-server01.xxxx.com" indicates the address of the firmware management server 200. "mfxxxx/8/0400006198/01/mfxxxx_recovery.bin" indicates a filename on the storage 204 of the firmware management server 200 of FIG. 5.

According to the present embodiment, configuration may be such that "/6/0400003246/11/" of reference numeral 6010 and "/8/0400006198/01/" of reference numeral 6020 do not indicate permanent locations, and are only accessible for a predetermined period or a predetermined number of times. For example, a restriction that the locations can be accessed only once may be imposed. Alternatively, a restriction may be imposed such that access is only possible until recovery completes.

<Processing Procedure of Boot Unit>

Figure 14:
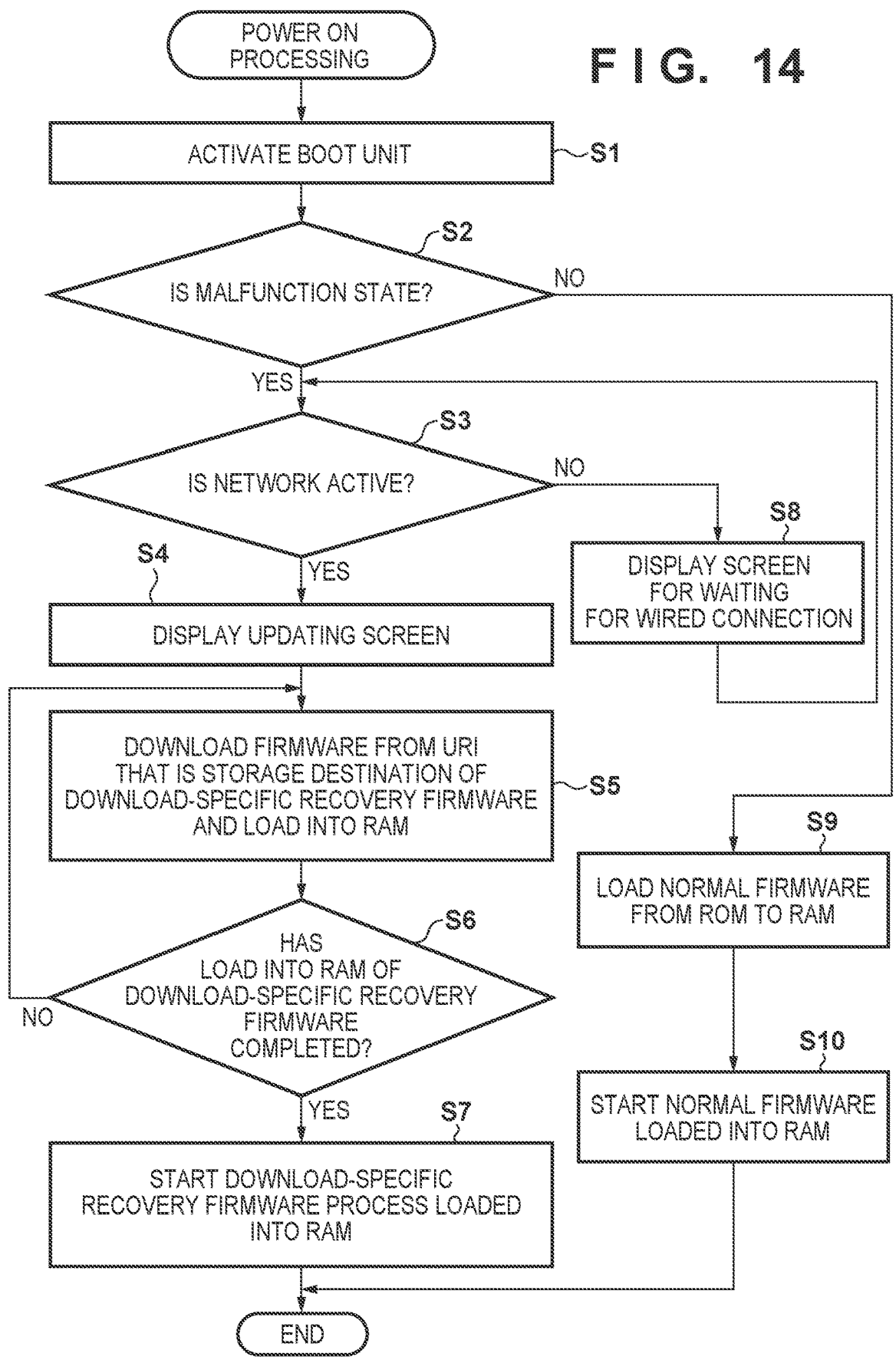
FIG. 14 is a flowchart illustrating a processing procedure of a boot unit 2101 according to the embodiment.

Next, a processing procedure of the boot unit 2101 according to the present embodiment will be described with reference to FIG. 14. First, when the MFP 100 is powered on in step S1, the CPU 101 of the MFP 100 reads the boot unit 2101 stored in the ROM 102 into the RAM 103 and activates it. Thereafter, the following processing of the boot unit 2101 is executed.

In step S2, the CPU 101 determines whether or not a malfunction state is occurring. In the present embodiment, it is determined that a malfunction has occurred when the value of the normal firmware update state 2104 stored in the ROM 102 remains "writing in progress". Here, a malfunction state is a state in which the ROM 102 of the MFP 100 is as shown in reference numerals 701 to 705 shown in FIG. 7, that is, a state in which the normal firmware is being updated and the update has not completed normally. Although not shown in FIG. 7, a case where all the normal firmware is erased is also included in the malfunction state. In other words, the malfunction state is a state in which at least a part of the normal firmware is missing, and the MFP 100 cannot operate normally. If it is determined in step S2 that a malfunction has occurred, the process proceeds to step S3, and if not, the process proceeds to step S9.

In step S3, the CPU 101 determines whether the communication unit 111 of the MFP 100 is connected to the network 300 and is in a state in which it can communicate with the firmware management server 200, that is, whether the network is in an active (functioning) state. If the network is functioning effectively, the process proceeds to step S4; otherwise, the process proceeds to step S8. In step S8, the CPU 101 displays a screen 1603 shown in FIG. 16 on the operation unit 105 to prompt the user to connect to the network. After that, the processing returns to step S8, and the active/inactive state of the network is periodically confirmed.

When it is determined that the network is active, in step S4, the CPU 101 displays a screen 1604 shown in FIG. 16 on the operation unit 105 and presents that the firmware is being updated. Subsequently, in step S5, the CPU 101 receives the recovery firmware from the firmware management server 200 based on the information stored in the URI 2106 of the download-specific firmware, and loads the recovery firmware into the RAM 103.

Next, in step S6, the CPU 101 determines whether the loading into the RAM of the download-specific recovery firmware has completed. If the loading into the RAM has completed, the process proceeds to step S7, and if not, the process returns to step S5. In step S7, the CPU 101 executes in RAM the download-specific recovery firmware for which storage into the RAM 103 has completed, and ends this process.

On the other hand, if it is determined in step S2 that the device is not malfunctioning, that is, if the value of the update state 2104 stored in the ROM 102 is "idle state", the process proceeds to step S9. In step S9, the CPU 101 reads the normal firmware 2102 stored in the ROM 102 from the ROM 102 and loads it into the RAM 103. Then, in step S10, the CPU 101 executes in RAM the normal firmware for which the load into RAM has completed, and ends the present process.

<Recovery Process Processing Procedure>

Figure 15:
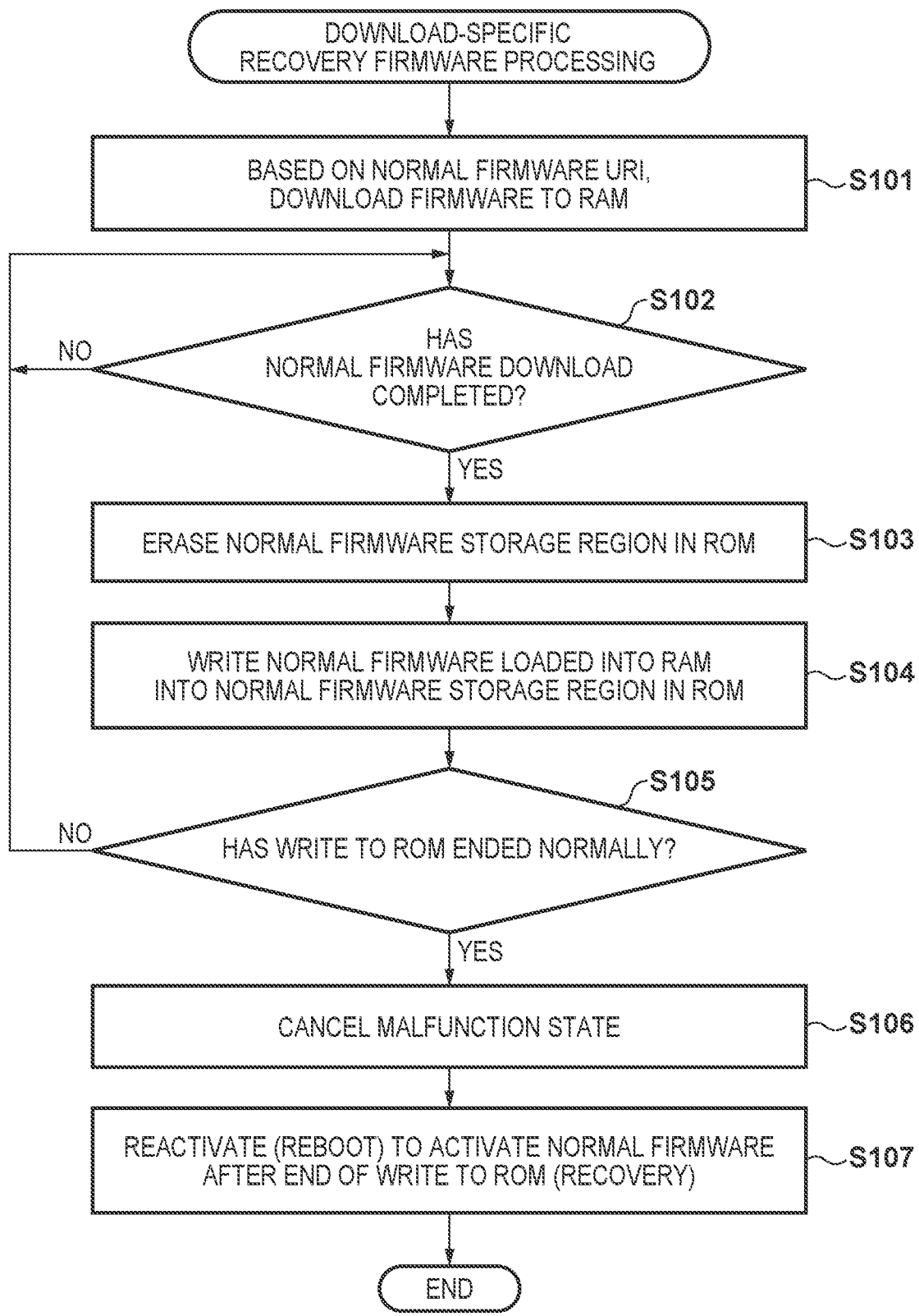
FIG. 15 is a flowchart illustrating a processing procedure for download-specific recovery firmware 2400 according to an embodiment.

Next, referring to FIG. 15, a processing procedure of a recovery process by download-specific recovery firmware according to the present embodiment will be described. In this process, the processing is started by the CPU 101 of the MFP 100 by the above step S7 of FIG. 14 being executed.

First, in step S101, the CPU 101 accesses the firmware management server 200 according to the normal firmware URI 2105 of the ROM 102, downloads the normal firmware, and loads it into the RAM 103.

Next, in step S102, the CPU 101 determines whether the loading into RAM of the normal firmware has completed. If the load into RAM has completed, the process proceeds to step S103, and if not, the process returns to step S101.

In step S103, the CPU 101 electrically erases the entire area of the normal firmware 2102 in the ROM 102. Also, in step S104, rather than a method of alternately erasing the ROM 102 and writing the normal firmware loaded into RAM to the ROM 102, the CPU 101 performs a method of temporarily storing everything in the RAM 103; however, a method of dividing the firmware into a plurality of regions in the same manner as in the above step S1008 and alternately erasing and writing is also possible.

Next, in step S105, the CPU 101 determines whether or not the writing to the ROM 102 has been completed normally. If writing has failed, the process is restarted from step S101. On the other hand, when the writing is normally completed, the CPU 101 changes the value of the normal firmware update state 2104 of the ROM 102 to "idle state" in order to cancel the malfunction state in step S106. Subsequently, in step S107, the CPU 101 reactivates the MFP 100 to activate the normal firmware 2102 in the ROM 102 where recovery is completed, and ends this process. This reactivation may be a software reboot or a hardware reboot.

<Screen Examples>

Next, referring to FIG. 16, an example of screens displayed on the operation unit 105 of the MFP 100 according to the present embodiment will be described. The screen 1601 and the screen 1602 have already been described in describing the sequence of FIG. 4, and therefore description thereof will be omitted.

The screen 1603 is a screen prompting the user to connect to the network in a malfunction state. In step S8 of FIG. 14 above, the screen is displayed on the operation unit 105 of the MFP 100. A button for the user to input that the user connected to the network may be included. In this case, it is possible to determine that there is an abnormality in the communication network such as a LAN cable abnormality when communication does not behave normally despite there being a connection.

The screen 1604 is a screen to be displayed during a firmware update or recovery. In step S4 of FIG. 14 above, the screen is displayed on the operation unit 105 of the MFP 100.

As described above, the information processing apparatus according to the present embodiment includes a volatile memory, a main firmware for causing the information processing apparatus to realize a predetermined function, and a non-volatile storage capable of storing communication firmware for booting. The information processing apparatus accesses a predetermined server using the communication firmware, obtains recovery firmware, and loads the recovery firmware into a volatile memory. Further, the information processing apparatus obtains an updated main firmware from the predetermined server using the loaded recovery firmware, and updates the main firmware stored in the non-volatile storage. As described above, according to the present embodiment, recovery firmware having a sophisticated communication function is obtained from the external server by using communication firmware of the boot unit having a simple communication function. Then, the latest main firmware is downloaded using the recovery firmware. As a result, main firmware or recovery firmware having a large program size can be stored in the external server, and not stored in the local MFP, and program recovery can be performed easily and with a limited storage capacity.

<Modifications>

The present invention is not limited to the above-described embodiment, and various modifications are possible. In the above-described embodiment, a case of a malfunction where the normal firmware update is not completed normally has been described. However, the malfunction may be due to other factors such as falsification by a third party. Therefore, whereas in the above-described embodiment, it is determined whether or not the firmware is malfunctioning by referring to the value of the update state 2104 of the normal firmware, the firmware may be determined to be malfunctioning or not in consideration of other factors as described above. Alternatively, it may be determined that there is a malfunction in a case where normal activation cannot be performed.

According to the present invention, even with a limited storage capacity, it is possible to easily recover a program.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-203607, filed Dec. 15, 2021, which is hereby incorporated by reference herein in its entirety.

What is claimed is:

1. An information processing apparatus having a predetermined function, the apparatus comprising:
a volatile memory;
a non-volatile storage capable of storing a main firmware for causing the information processing apparatus to realize the predetermined function and a communication firmware for booting; and
one or more controllers including one or more processors, the one or more controllers being configured to:
access a predetermined server using the communication firmware;
obtain a recovery firmware;
load the recovery firmware into the volatile memory; and
obtain from the predetermined server an updated main firmware by using the loaded recovery firmware and to update the main firmware stored in the non-volatile storage,
wherein in a case where the information processing apparatus is in a malfunction state in which the information processing apparatus cannot provide the predetermined function, the recovery firmware is obtained from the predetermined server,
wherein in a case where a main firmware managed by the predetermined server is updated, the main firmware managed by the predetermined server is obtained, and the main firmware stored in the non-volatile storage is updated therewith, and
wherein in a case where the update of the main firmware stored in the non-volatile storage has not completed normally, the one or more controllers determine that the information processing apparatus is in the malfunction state, and the recovery firmware is obtained from the predetermined server.

2. The information processing apparatus according to claim 1, wherein the one or more controllers are further configured to:
store information indicating that rewriting is in-progress in the non-volatile storage prior to starting to update the main firmware stored in the non-volatile storage, change the information indicating that rewriting is in-progress to information indicating an idle state after the update has completed normally, and obtain the recovery firmware from the predetermined server in a case where the information indicating that rewriting is in-progress is stored in the non-volatile storage when the information processing apparatus is activated.

3. The information processing apparatus according to claim 1, wherein the one or more controllers are further configured to:
obtain, from the predetermined server, storage destination information indicating a storage location at which the main firmware is stored and a storage location at which the recovery firmware is stored,
store the storage destination information in the non-volatile storage when obtaining the main firmware from the predetermined server, and
obtain the recovery firmware from the predetermined server by using the storage destination information stored in the non-volatile storage.

4. The information processing apparatus according to claim 3, wherein the storage location is only accessible for a predetermined period or a predetermined number of times.

5. The information processing apparatus according to claim 1, wherein the one or more controllers are further configured to
cause a screen for querying whether or not a network is active to be displayed on a display unit in a case where it is determined that the information processing apparatus is in the malfunction state.

6. The information processing apparatus according to claim 5, wherein the one or more controllers are further configured to
cause an indication that the main firmware is being updated to be displayed on the display unit when the recovery firmware is obtained from the predetermined server.

7. The information processing apparatus according to claim 1, wherein the one or more controllers are further configured to
update the main firmware in a case where a predetermined user operation is received.

8. The information processing apparatus according to claim 1, wherein the communication firmware for booting has a simpler communication function than the recovery firmware, and has a smaller program size compared to the recovery firmware.

9. The information processing apparatus according to claim 8, wherein the recovery firmware performs secure communication with the predetermined server.

10. A method for controlling an information processing apparatus comprising a volatile memory and a non-volatile storage capable of storing a main firmware for causing the information processing apparatus to realize a predetermined function and a communication firmware for booting, the method comprising:
accessing a predetermined server using the communication firmware, obtaining a recovery firmware, and loading the recovery firmware into the volatile memory; and
obtaining from the predetermined server an updated main firmware using the loaded recovery firmware and updating the main firmware stored in the non-volatile storage,
wherein in a case where the information processing apparatus is in a malfunction state in which the information processing apparatus cannot provide the predetermined function, the recovery firmware is obtained from the predetermined server,
wherein in a case where a main firmware managed by the predetermined server is updated, the main firmware managed by the predetermined server is obtained, and the main firmware stored in the non-volatile storage is updated therewith, and
wherein in a case where the update of the main firmware stored in the non-volatile storage has not completed normally, the information processing apparatus is determined to be in the malfunction state, and the recovery firmware is obtained from the predetermined server.

11. A non-transitory computer-readable storage medium storing a computing program for causing a computer to execute each step in a method for controlling an information processing apparatus comprising a volatile memory and a non-volatile storage capable of storing a main firmware for causing the information processing apparatus to realize a predetermined function and a communication firmware for booting, the method comprising:

accessing a predetermined server using the communication firmware, obtaining a recovery firmware, and loading the recovery firmware into the volatile memory; and obtaining from the predetermined server an updated main firmware using the loaded recovery firmware and updating the main firmware stored in the non-volatile storage therewith, wherein in a case where the information processing apparatus is in a malfunction state in which the information processing apparatus cannot provide the predetermined function, the recovery firmware is obtained from the predetermined server, wherein in a case where a main firmware managed by the predetermined server is updated, the main firmware managed by the predetermined server is obtained, and the main firmware stored in the non-volatile storage is updated therewith, and wherein in a case where the update of the main firmware stored in the non-volatile storage has not completed normally, the information processing apparatus is determined to be in the malfunction state, and the recovery firmware is obtained from the predetermined server.

\* \* \* \* \*